(12) United States Patent
Sevcik et al.

(10) Patent No.: US 8,523,022 B2
(45) Date of Patent: Sep. 3, 2013

(54) SYSTEM AND METHOD FOR DISPENSING A PREDETERMINED AMOUNT OF A FLUID

(75) Inventors: Scott E. Sevcik, Crystal Lake, IL (US); Andrew Tobler, Geneva, IL (US)

(73) Assignee: IMI Cornelius, Inc., Glendale Heights, IL (US)

( * ) Notice: Subject to any disclaimer, the term of this patent is extended or adjusted under 35 U.S.C. 154(b) by 91 days.

(21) Appl. No.: 13/229,632

(22) Filed: Sep. 9, 2011

(65) Prior Publication Data

US 2013/0062545 A1 Mar. 14, 2013

(51) Int. Cl.
*B65D 88/54* (2006.01)

(52) U.S. Cl.
USPC ............................................ 222/322; 222/129

(58) Field of Classification Search
USPC ............ 222/322, 129, 129.1–129.4, 138–142, 222/465.1, 466–475
See application file for complete search history.

(56) References Cited

U.S. PATENT DOCUMENTS

| | | | | |
|---|---|---|---|---|
| 3,455,332 A | * | 7/1969 | Cornelius | .................. 366/167.1 |
| 4,741,355 A | | 5/1988 | Credle, Jr. et al. | |
| 4,863,068 A | * | 9/1989 | Smith | ........................ 222/129.1 |
| 5,129,549 A | * | 7/1992 | Austin | ........................ 222/129.1 |
| 5,303,849 A | * | 4/1994 | Credle, Jr. | .................. 222/129.1 |
| 5,791,523 A | * | 8/1998 | Oh | .............................. 222/146.6 |
| 5,797,524 A | | 8/1998 | Lentz | |
| 6,003,734 A | * | 12/1999 | Oh | .............................. 222/146.6 |
| 2008/0191155 A1 | | 8/2008 | Scollay | |

OTHER PUBLICATIONS

PCT Search Report, Nov. 16, 2012.

* cited by examiner

*Primary Examiner* — Lien Ngo
(74) *Attorney, Agent, or Firm* — Niro, Haller & Niro

(57) ABSTRACT

A system and method for dispensing a predetermined portion of a beverage or drink additive using a cost effective portion control valve that replaces electrical components with mechanical components. The present invention dispenses a controlled portion of a beverage when a lever is activated. A magnetically coupled linkage system can control the exact amount of fluid dispensed. A valve block contains a beverage input, a beverage outlet, and a valve seal. A lever arm is connected to the valve seal and connected to a magnetic housing containing a valve magnet. A yoke pivots about the valve block where the yoke contains a yoke magnet aligned to interface with the valve magnet. A lever arm return spring is connected to the lever arm and the valve block to bias the lever arm return spring to a resting position. As the yoke pivots beyond a predetermined distance, the yoke magnet separates from the valve magnet allowing the lever arm to return to the resting position closing the valve.

9 Claims, 4 Drawing Sheets

US 8,523,022 B2

SYSTEM AND METHOD FOR DISPENSING A PREDETERMINED AMOUNT OF A FLUID

BACKGROUND OF THE INVENTION

1. Field of the Invention

The present invention relates generally to the field of beverage dispensers and more particularly to an advanced control valve for a beverage dispenser.

2. Description of the Prior Art

Portion control valves are used in beverage dispensers to control the portion of a beverage being dispensed. There are numerous considerations in the design and manufacture of portion control valves, including the cost and maintenance of the device. Prior art devices use an electric solenoid, or other electric motors, to control the opening and closing of a valve. The electric solenoid or electric motor may contain a timing device for keeping the valve open for a predetermined time. Such electric devices are costly, especially in beverage dispensers having multiple valves and therefore requiring multiple electric devices. Moreover, the prior art devices require electricity and therefore may only be used where electricity is available. Electric devices may also require periodic maintenance, which further increases the cost of operating a prior art device.

It would be extremely advantageous to have an advanced portion control valve which dispenses controlled portions at a reduced cost by eliminating all electronic components.

SUMMARY OF THE INVENTION

The present invention relates to a valve for dispensing a predetermined portion of a beverage. One aspect of the invention recognizes that a more cost effective portion control valve can be achieved by replacing the electric components with mechanical components for dispensing a controlled portion of a beverage when a lever is activated. A pair of magnets or a magnet with mating magnetic material, i.e. metal tab, screw head, etc., in a mechanical system control an amount of fluid dispensed. A valve block contains a beverage inlet, a beverage outlet, and a valve seal. A lever arm is connected to the valve seal and connected to a magnetic housing containing a valve magnet. A yoke pivots about the valve block where the yoke contains a yoke magnet or magnetic material, i.e. metal tab, aligned to interface with the valve magnet. A lever arm return spring is connected to the lever arm and the valve block to bias the valve seal to a resting/closed position. As the yoke pivots beyond a predetermined distance, the yoke magnet separates from the valve magnet allowing the valve arm to return to the resting position closing the valve.

DESCRIPTION OF THE FIGURES

Attention is now directed to several drawings that illustrate features of the present invention.

Figure 1:
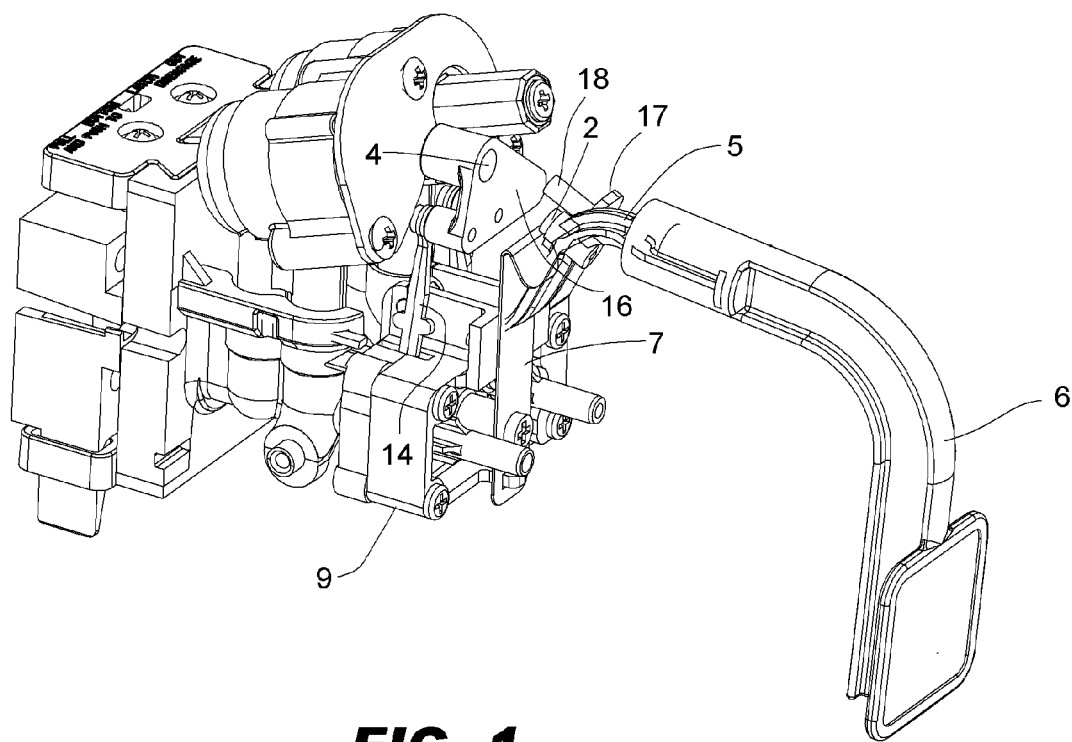
FIG. 1 is a side perspective view of an embodiment of the present invention.

Several drawings and illustrations have been presented to aid in understanding the present invention. The scope of the present invention is not limited to what is shown in the figures.

DETAILED DESCRIPTION OF THE INVENTION

Referring now to the drawings, in which like numerals refer to like elements throughout the several views, FIGS. 1-5 show an embodiment of the mechanical portion control linkage system of the present invention. The mechanical portion control linkage system may be used as part of a beverage dispenser for dispensing various types of beverages or other fluids. In particular, the beverage dispenser of the present invention can open two or more valves simultaneously to allow a predetermined flow of two or more different beverage fluids wherein a nozzle downstream of the valve can then mix the beverage fluids to produce a portion amount of a beverage drink or an additive such as flavor.

Figure 2:
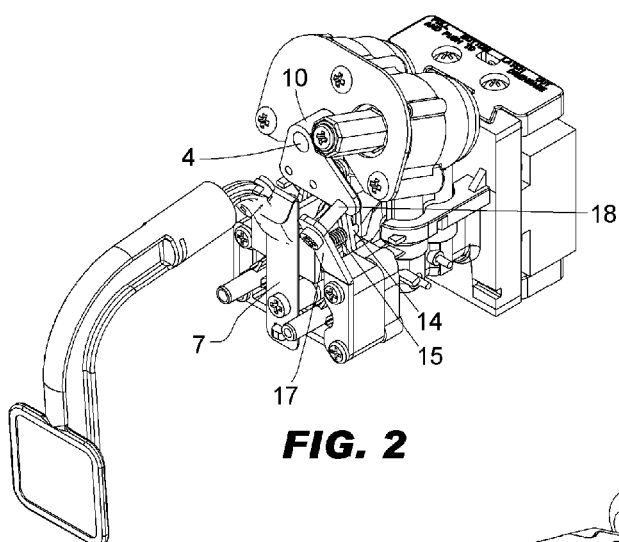
FIG. 2 is a front perspective view of the embodiment of FIG. 1
Figure 3:
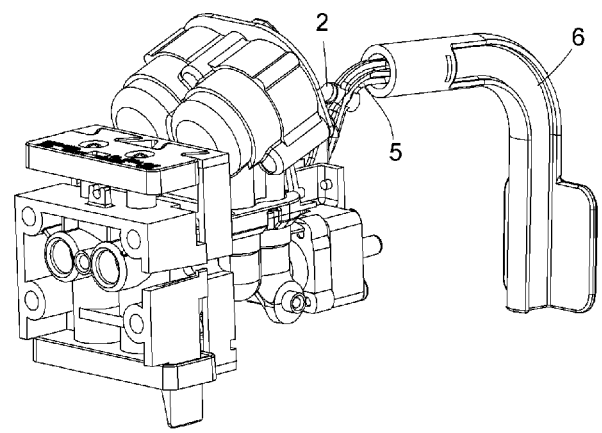
FIG. 3 is a rear perspective view of the embodiment of FIG. 1

Turning to FIGS. 1-3, a valve block 9 defines a passageway for the passage of fluid. The valve block 9 may include one or more such passageways. As previously stated, multiple passageways allow for the simultaneous dispensing of multiple fluids. The passageway has a fluid inlet for accepting a fluid to be dispensed, and a fluid outlet through which fluid is dispensed. A valve seal 11 is located between the fluid inlet and the fluid outlet. The valve seal 11 blocks the passageway when the valve seal is in its closed position and allows flow when the valve is in an open position. The valve seal 11 is operably coupled to a lever arm 14 which is an elongated rod, as specifically shown in FIGS. 5A and 5C. The assembly can include one, two or more lever arms 14 attached to one, two or more valve seals 11 at a first end and to a stop tab member 16 at the other end. The stop tab member 16 holds the lever arms together. Rotation of the lever arm 14 causes the valve seal or seals 11 to partially open, thereby allowing passage of fluid through the passageway and to the fluid outlet. The stop tab member 16 can contain a magnet housing 10 with a magnet 4. The lever arm can thus be magnetically, or otherwise, coupled to a yoke 5 and lever 6. Therefore, activation of the yoke 5 and lever 6 causes the lever arm 14 to rotate and the valve seal 11 to open. After the lever 6 and yoke 5 have moved a particular predetermined distance, they disengage from the lever arm 14 (typically by pulling the magnets apart), allowing the lever arm to return to a resting position closing the valve seal 11.

The lever 6 and the yoke 5 may be permanently attached to each other, or the lever 6 may be detachable from the yoke 5. In some embodiments, the lever 6 may be easily detached from the yoke 5. Detaching the lever 6 from the yoke 5 allows for ease of cleaning the separate components.

A yoke magnet 2 can be attached to the yoke 5. Typically, the yoke magnet 2 is a magnetic screw which is screwed into the yoke 5. While this is the preferred embodiment, the yoke magnet 2 may take many different forms and configurations. Any form of yoke magnet, and any form of coupling between the yoke and the lever arm is within the scope of the present invention.

Figure 4A:
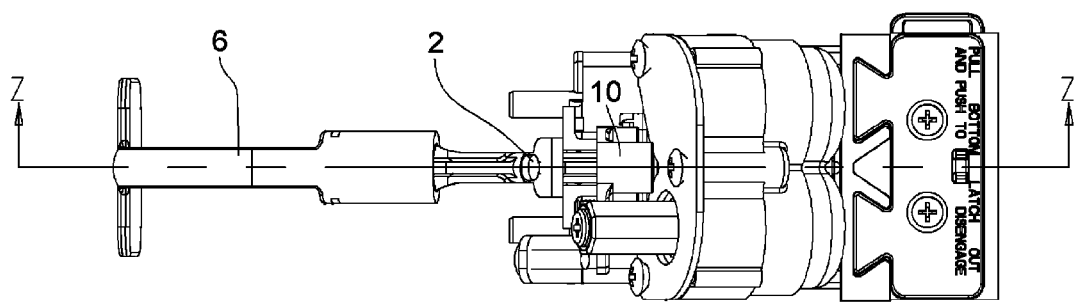
FIG. 4A is a top view showing the location of Section Z-Z.
Figure 4B:
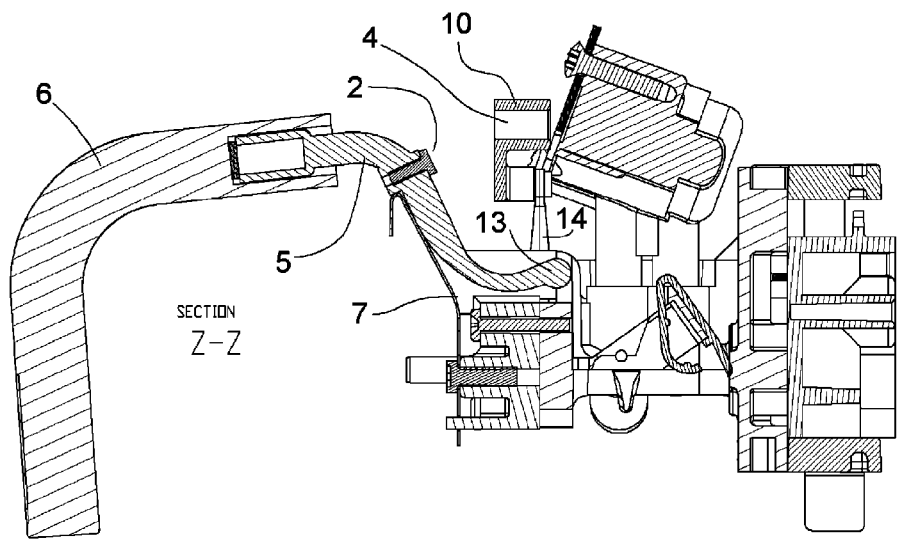
FIG. 4B is a sectional view taken along Section Z-Z.

FIG. 4A is a top view of an embodiment showing the location of section Z-Z. This section is shown in FIG. 4B. As can be seen in FIGS. 4A-4B, and in FIG. 4B in particular, the yoke 5 is fastened to a pivot point 13 on the valve block. The pivot point 13 is positioned such that the yoke magnet 2 interfaces with a lever arm magnet 4 in the magnetic housing 10 when the yoke 5 is in a rest position. Activating the lever 6 causes the yoke magnet 2 to rotate about the pivot point 13. In FIG. 4B, the yoke 5 is shown in its activated position, with the yoke magnet 2 and the lever arm magnet 4 being decoupled.

A yoke spring 7 causes the yoke 5 and handle 6 to return to a relaxed position after being pulled.

Figure 5A:
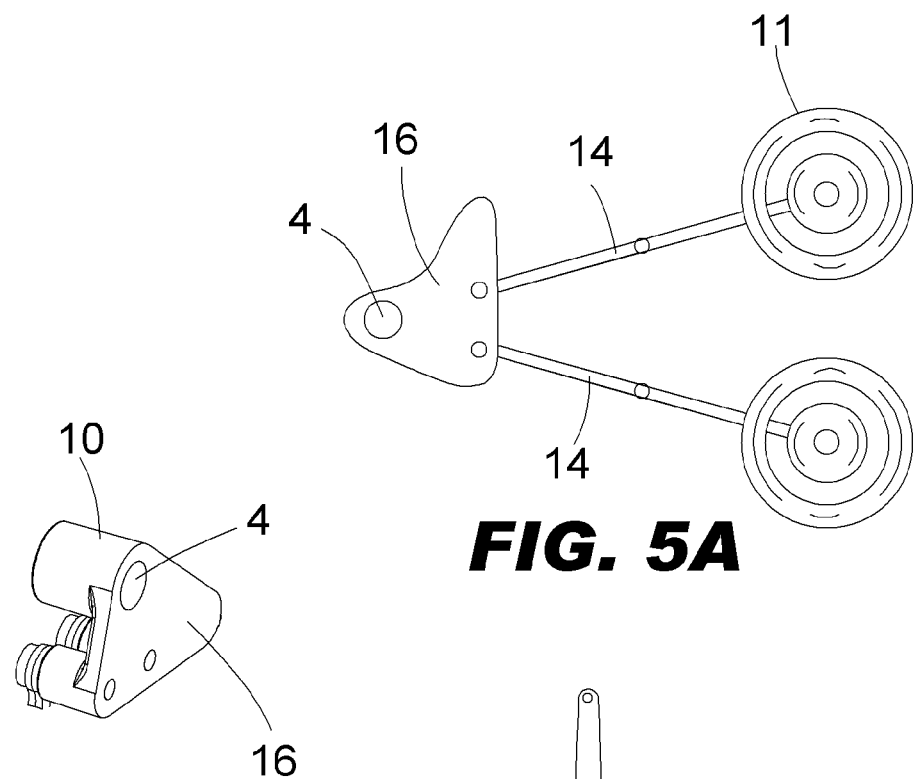
FIG. 5A is a front view of the lever arm mechanism.
Figure 5B:
FIG. 5B is a perspective view of the lever arm coupling piece.
Figure 5C:
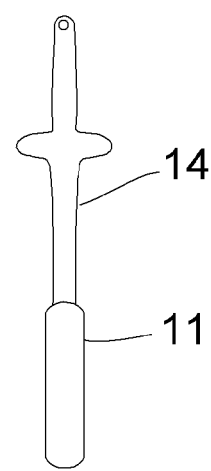
FIG. 5C is a top view of a lever arm rod.

As shown in FIGS. 5A-5C, a magnetic housing 10 can be attached to a stop tab member 16, which can be a flange that protrudes from the magnetic housing 10. The magnetic housing 10 and stop tab member 16 can be connected to at least one lever arm 14. Each lever arm 14 is normally pivoted about a valve in the valve block and configured to open the valve seal when the lever arm 14 rotates away from its rest position. In this way, rotation of the magnetic housing 10 and stop tab member 16 causes each connected lever arm 14 to rotate away from its rest position, thereby opening its associated valve. The number of lever arm and valves can be varied to allow a desired number of liquids to be dispensed. For example, FIG. 5A shows two lever arms 14, each coupled to a separate valve seal 11 and also coupled to the magnetic housing 10 and stop tab member 16. The lever arm assembly of FIGS. 5A-5C can be used to control two passageways, thereby enabling the system to dispense predetermined portions of two separate beverage fluids. These fluids are usually mixed in a nozzle further downstream to produce a beverage drink. In turn, lever arm assembly of FIGS. 5A-5C can be used to control one passageway, thereby enabling the system to dispense predetermined portions of an drink additive directly into a drink or cup.

Returning to FIG. 2, a lever arm return spring 15 biases the lever arm 14 to its rest position. The lever arm return spring 15 may be a compression spring having two end points. One end point may be connected to the lever arm 14, and the other end point may be connected to a connection point on the valve block. The connection point on the valve block is typically positioned between the lever arm 14 and the direction of rotation of the lever arm 14. In this embodiment, the lever arm return spring 15 compresses between the lever arm 14 and the valve block as the lever arm 14 rotates to open the valve. The load of the compressed spring acts as a force that biases the lever arm 14 to its rest position.

In an alternative embodiment, the lever arm return spring 15 may be a tension/extension spring connected between the lever arm 14 and the valve block. In this embodiment, one end of the tension/extension spring is connected to the lever arm 14, and the second end of the tension/extension spring is connected to a connection point on the valve block. The connection point on the valve block is located behind the lever arm 14 and away from the direction of rotation. The lever arm 14 rotates away from the connection point on the valve block, thereby creating a tension force in the tension/extension spring. The tension force biases the lever arm 14 to its rest position. The lever arm return spring 15 may be connected directly to the lever arm 14, or it may act indirectly on the lever arm 14 by being connected to the magnetic housing 10.

As shown in FIGS. 1-3, in order to dispense a portion of a beverage, an operator activates the lever 6 by pushing on it. The lever 6, yoke 5, and yoke magnet 2 rotate about the pivot point 13. The yoke magnet 2 is magnetically coupled to the magnetic housing 10, thereby causing the magnetic housing 10 and the attached lever arm 14 to rotate with the yoke magnet 2. The magnetic housing 10 and lever arm 14 rotate against the force of the lever arm return spring 15. As the lever arm 14 rotates away from its rest position, it opens the attached valve seal 11 and beverage is dispensed through the valve outlet. The valve seal 11 remains open and beverage is dispensed as long as the lever arm 14 remains rotated away from its rest position.

As the magnetic housing 10 rotates further from its rest position, the load or tension in the lever arm return spring 15 increases. Once the magnetic housing 10 rotates to a certain predetermined depression distance, the load or tension in the lever arm return spring 15 becomes greater than the magnetic force coupling the yoke magnet 2 and the magnetic housing 10. Accordingly, the force of the lever arm return spring 15 causes the yoke magnet 2 and the magnetic housing 10 to decouple and disengage. With the magnetic coupling between the yoke magnet 2 and the magnetic housing 10 disengaged, the lever arm return spring 15 returns the lever arm 14 to its rest position. The valve seal 11 closes when the lever arm 14 is returned to its rest position, and the portion of beverage has been dispensed.

The depression distance at which the yoke magnet 2 and the lever arm magnet 4 disengage may be adjusted, thereby adjusting the distance that the lever arm 14 rotates before disengaging from the magnetic housing 10. A greater depression distance therefore causes the valve seal 11 to be open for a longer period of time, increasing the volume of the dispensed portion. The depression distance may be varied, for example, by altering the strength of the magnetic coupling, or the strength of the lever arm return spring 15.

A permanent stop 17 may optionally be attached to the valve block to disengage the magnetic housing 10 from the yoke magnet 2 at a depression distance. The permanent stop 17 can extend from the valve block to receive the stop tab member 16 protruding from the magnetic housing 10. As the lever 6 is operated, the yoke magnet 2 and the magnetic housing 10 rotate towards the depression distance. At the depression distance, the permanent stop 17 engages the stop tab 16, but does not engage the lever 6, yoke 5, or yoke magnet 2. The yoke 5 decouples from the magnetic housing 10, and the lever arm return spring 15 forces the magnetic housing 10 and the attached lever arm 14 to return to their rest position.

The permanent stop 17 may be adjustable such that the depression distance at which the permanent stop 17 receives the stop tab 16 is varied. In one embodiment, the permanent stop 17 includes an adjustment screw 18. The adjustment screw 18 can be screwed in to the permanent stop 17. As the adjustment screw 18 is screwed in to the permanent stop 17, it extends through the permanent stop 17 and acts to engage the stop tab 16. In this embodiment, the depression distance is decreased as the adjustment screw 18 is screwed further into the permanent stop 17, and the depression distance is increase as the adjustment screw 18 is unscrewed from the permanent stop 17. The depression distance may be varied using many other permanent stop 17 configurations.

The mechanical portion control linkage system may include a lever yoke return spring 7. As shown in FIG. 2, the lever yoke return spring 7 is connected to the valve block. The lever yoke return spring 7 acts to return the yoke 5 and lever 6 to their rest position after the lever 6 is activated by the operator. In an embodiment, the lever yoke return spring 7 can be stainless steel. Any strong spring material is within the scope of the present invention. The yoke 5 and lever 6 may be biased to its rest position using many different springs and configurations, including through the use of a compression spring or a tension/extension spring.

Several descriptions and illustrations have been provided to aid in understanding the present invention. One with skill in the art will realize that numerous changes and variations can be made without departing from the spirit of the invention. Each of these changes and variations is within the scope of the present invention. In particular, the present invention will work with any type of fluid if proper valves are used. This includes both liquids and gases.

What is claimed is:

1. A fluid dispensing apparatus comprising:
a base member defining a passageway for the passage of fluid;
a valve member mounted to the base member, the valve member normally closing the passageway;
a handle member pivotally connected to the base member; the handle member and the valve member being operatively connected over a predetermined distance to allow opening of the passageway;
the handle member and the valve member releasing from each other at an end of the predetermined distance allowing the valve member to close the passageway; and
wherein the handle member and the valve member are operatively connected by a pair of magnets.

2. The fluid dispensing apparatus of claim 1 wherein said valve member further comprises a lever arm connected at a first end to magnet holder holding one of said pair of magnets and at a second end to at least one valve seal.

3. The fluid dispensing apparatus of claim 2 further comprising a single or pair of valve seals.

4. The fluid dispensing apparatus of claim 2 wherein a second of said magnets is contained in said handle member.

5. A method for dispensing a portion amount of liquid beverage comprising:
coupling a lever arm to a yoke and adapting said lever arm so that an operator can depress said lever arm to dispense liquid beverage;
allowing the lever arm and yoke to rotate about a pivot point as said lever arm is depressed;
magnetically coupling a lever arm to said yoke so that said lever arm follows said yoke as said yoke rotates, said lever arm opening a valve seal at a certain point in said rotation allowing said liquid beverage to be dispensed; and
biasing said lever arm with a lever arm return spring so that force increases on said lever arm as said lever arm rotates, wherein after a predetermined amount of rotation, said lever arm separates from said yoke returning to a position wherein said valve seal closes and said dispensing stops.

6. The method of claim 5 further comprising an adjustment screw allowing adjustment of said predetermined amount of rotation.

7. The method of claim 6 wherein said adjustment screw is attached to a base member and encounters said lever arm during rotation to prevent further rotation of said lever arm.

8. The method of claim 5 further comprising a yoke return spring that causes said lever arm and yoke to return to a rest position when said handle is released by said operator.

9. The method of claim 5 wherein said magnetic coupling comprises a yoke magnet attached to said yoke and a lever arm magnet attached to said lever arm.

* * * * *